(12) United States Patent
Wipplinger et al.

(10) Patent No.: US 8,335,642 B2
(45) Date of Patent: Dec. 18, 2012

(54) METHOD AND APPARATUS FOR DISPLAYING A SYMBOL FOR A VEHICLE

(75) Inventors: Patrick Ralf Wipplinger, Morfelden-Walldorf (DE); Rick Ellerbrock, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 1211 days.

(21) Appl. No.: 11/747,710

(22) Filed: May 11, 2007

(65) Prior Publication Data

US 2008/0281512 A1 Nov. 13, 2008

(51) Int. Cl.
*G01C 21/30* (2006.01)
*G06F 17/00* (2006.01)
*G08G 1/123* (2006.01)
*G06G 7/78* (2006.01)

(52) U.S. Cl. ..... 701/409; 701/455; 701/457; 340/995.1; 340/995.14; 340/971; 340/972

(58) Field of Classification Search ............. 701/1, 200, 701/207, 208, 300, 3, 212–214, 400, 408, 701/409, 428, 454, 455, 457, 466, 468, 487, 701/532, 538, 412, 431, 432, 436, 458, 460, 701/469; 340/988, 989, 995.1, 995.14, 995.15, 340/995.25, 995.26, 995.27, 945, 971, 990, 340/972

See application file for complete search history.

(56) References Cited

U.S. PATENT DOCUMENTS

| | | | | |
|---|---|---|---|---|
| 4,489,389 A | * | 12/1984 | Beckwith et al. | 345/421 |
| 5,519,392 A | * | 5/1996 | Oder et al. | 340/995.27 |
| 6,175,802 B1 | * | 1/2001 | Okude et al. | 701/208 |
| 6,571,166 B1 | * | 5/2003 | Johnson et al. | 701/120 |
| 7,212,920 B1 | * | 5/2007 | Bailey et al. | 701/211 |
| 7,564,372 B1 | * | 7/2009 | Bailey et al. | 340/961 |
| 2006/0220923 A1 | * | 10/2006 | Tanizaki et al. | 340/995.1 |
| 2007/0168111 A1 | * | 7/2007 | Dubourg | 701/120 |
| 2007/0168120 A1 | * | 7/2007 | Vandenbergh et al. | 701/208 |
| 2007/0240056 A1 | * | 10/2007 | Pepitone | 715/705 |
| 2007/0241935 A1 | * | 10/2007 | Pepitone et al. | 340/958 |
| 2008/0191903 A1 | * | 8/2008 | Dubourg et al. | 340/958 |

* cited by examiner

*Primary Examiner* — Thomas Tarcza
*Assistant Examiner* — Edward Pipala
(74) *Attorney, Agent, or Firm* — Yee & Associates, P.C.

(57) ABSTRACT

A computer implemented method, apparatus, and computer usable program code for displaying a symbol representing an aircraft. The symbol is displayed representing the aircraft at a location on a map at a first level of detail. The symbol represents a position of the aircraft on the map, moves on the map in a manner that represents movement of the aircraft with respect to features on the map, has a fixed level of detail that does not change as levels of detail change for the map, and has an anchor point at a first point on the symbol in which the anchor point is used as a point of rotation for the symbol. A second point is identified for the anchor point on the symbol such that view point of the symbol at the second level of detail remains fixed relative to the display of the symbol at the first level of detail. The map is displayed at the second level of detail. The symbol is displayed on the map using the second point for the anchor point.

17 Claims, 8 Drawing Sheets

METHOD AND APPARATUS FOR DISPLAYING A SYMBOL FOR A VEHICLE

BACKGROUND INFORMATION

1. Field

The present invention relates generally to an improved data processing system and in particular to a method and apparatus for displaying locations of vehicles. Still more particularly, the present invention relates to a computer implemented method, apparatus, and computer usable program code for displaying a symbol representing a vehicle.

2. Background

Runway incursions and taxi incidents are a safety concern at airports around the world. Software applications have been developed to help reduce these incursions and incidents from occurring. One type of application is a moving map application that helps orient the flight crew to the position of an aircraft on the ground in relation to runways, taxiways, and airport structures. This moving map application allows users to identify their position to these different objects without reference to paper charts. In this manner, moving map applications improve safety and operational efficiency margins through increased positional awareness and reduced flight crew workload.

One example of a moving map application is Jeppesen Airport Moving Map, which is a product available from Jeppesen, Sanderson, Inc. These moving map applications also may provide position of an aircraft in the air.

Most moving map applications show airports, special use airspace, navigational aids, and other ground references. These moving map applications provide the user with an identification of the location of an aircraft and its relative heading using a global positioning system or other navigational equipment that provides location information of the aircraft.

Currently, when the flight crew is preparing to land or taxiing in preparation for takeoff, a high workload is present. The flight crew must fill in paperwork and communicate with others prior to these events. Identifying the location of an aircraft using paper maps is an example of a task that occurs during these times.

SUMMARY

The advantageous embodiments of the present invention provide a computer implemented method, apparatus, and computer usable program code for displaying a symbol representing an aircraft. The symbol is displayed representing the aircraft at a location on a map at a first level of detail. The symbol represents a position of the aircraft on the map, moves on the map in a manner that represents movement of the aircraft with respect to features on the map, has a fixed level of detail that does not change as levels of detail change for the map, and has an anchor point at a first point on the symbol in which the anchor point is used as a point of rotation for the symbol. A second point is identified for the anchor point on the symbol such that a view point of the symbol at the second level of detail remains fixed relative to the display of the symbol at the first level of detail. The map is displayed at the second level of detail. The symbol is displayed on the map using the second point for the anchor point.

In another advantageous embodiment of the present invention, the symbol is displayed representing the vehicle at a first level of detail, wherein the symbol has an anchor point at a first location on the symbol, wherein the anchor point is a point at which the symbol rotates. A second location is identified for the anchor point on the symbol such that the view point of the symbol at the second level of detail remains fixed relative to the display of the symbol at the first level of detail in response to receiving a request of a second level of detail. The symbol using the second location is displayed for the anchor point.

In yet another advantageous embodiment of the present invention, a computer program product contains a computer usable program code for displaying a symbol representing an aircraft. The computer program product has computer usable program code to display the symbol representing the aircraft at a location on a map at a first level of detail, wherein the symbol represents a position of the aircraft on the map, moves on the map in a manner that represents movement of the aircraft with respect to features on the map, has a fixed level of detail that does not change as levels of detail change for the map, and has an anchor point at a first point on the symbol in which the anchor point is used as a point of rotation for the symbol. The computer usable program code identifies a second point for the anchor point on the symbol such that a view point of the symbol at the second level of detail remains fixed relative to the display of the symbol at the first level of detail in response to receiving a request of a second level of detail. Computer usable program code is present in the computer program product to display the map at the second level of detail. Computer usable program code displays the symbol on the map using the second point for the anchor point.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
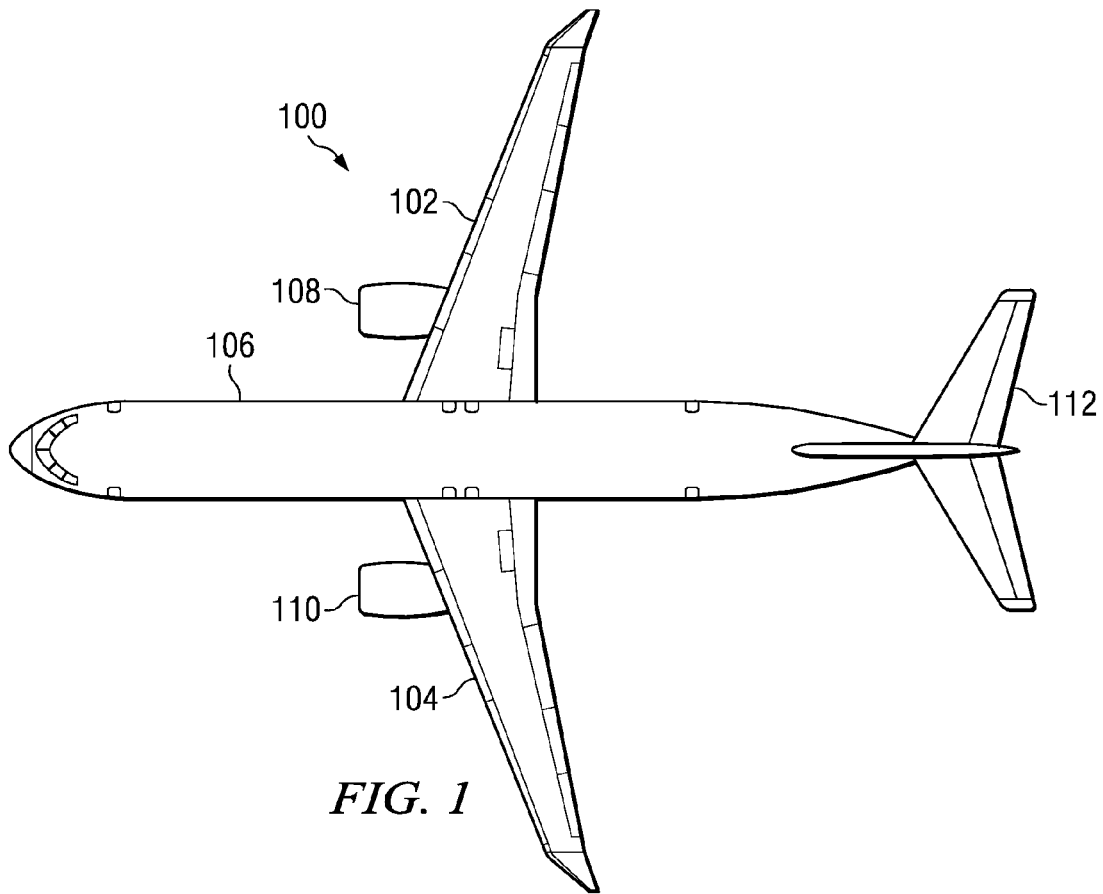
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment the present invention may be implemented. Aircraft 100 is an example of an aircraft in which an application identifying the location and position of aircraft 100 on a map as aircraft 100 moves may be implemented. In this illustrative example, aircraft 100 has wings 102 and 104 attached to body 106. Aircraft 100 includes wing mounted engine 108, wing mounted engine 110, and tail 112.

The different advantageous embodiments of the present invention recognize that moving map applications allow for a flight crew to accurately identify their location and direction of travel on a moving map. The different advantageous embodiments also recognize that improvements to this type of moving map application would increase the accuracy at which a user may identify the user's own position and view point in respect to the depicted aircraft position and direction on the map. A moving map, in these examples, is a map on which a symbol is displayed representing a vehicle. The map "moves" such that the symbol is displayed to show the location of the vehicle on the map. The symbol also is displayed in a manner that shows the direction in which the vehicle is pointed or heading with respect to a view point in the vehicle. The view point is the location of an operator, such as a pilot, in the aircraft that the symbol represents.

The different advantageous embodiments of the present invention provide a computer implemented method, apparatus, and computer usable program code for displaying a symbol representing a vehicle. The symbol representing the vehicle is displayed at a first level of detail, wherein the symbol has an anchor point at a first location on the symbol, wherein the anchor point is a point at which the symbol rotates. Responsive to receiving a request of a second level of detail, a second location for the anchor point on the symbol is identified such that view point of the symbol at the second level of detail remains fixed relative to the display of the symbol at the first level of detail. The symbol is displayed using the second location for the anchor point.

In one embodiment, the symbol represents an aircraft. The symbol representing the aircraft is displayed at a location on a map at a first level of detail. The symbol represents a position of the aircraft on the map, moves on the map in a manner that represents movement of the aircraft with respect to features on the map, has a fixed level of detail that does not change as levels of detail change for the map, and has an anchor point at a first point on the symbol in which the anchor point is used as a point of rotation for the symbol. Responsive to receiving a request of a second level of detail, a second point for the anchor point is identified on the symbol such that view point of the symbol at the second level of detail remains fixed relative to the display of the symbol at the first level of detail. The map is displayed at the second level of detail. The symbol is displayed on the map using the second point for the anchor point.

Figure 2:
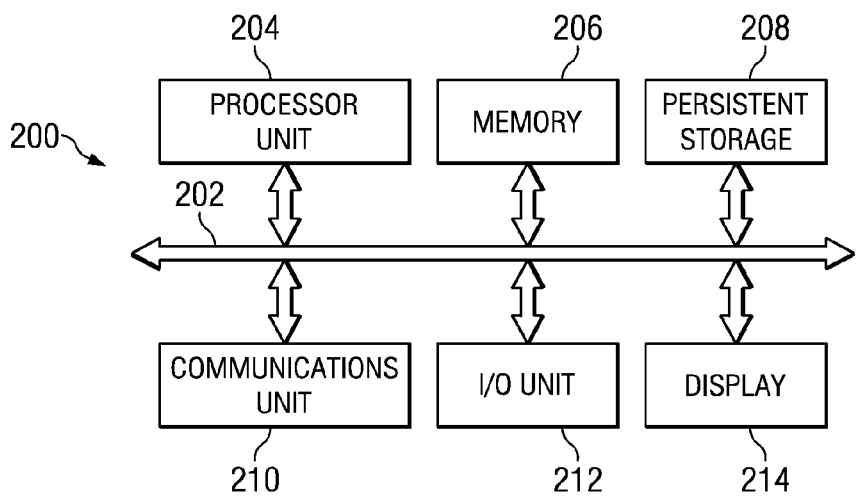
FIG. 2 is a diagram of a data processing system in accordance with an illustrative embodiment of the present invention.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

Figure 3:
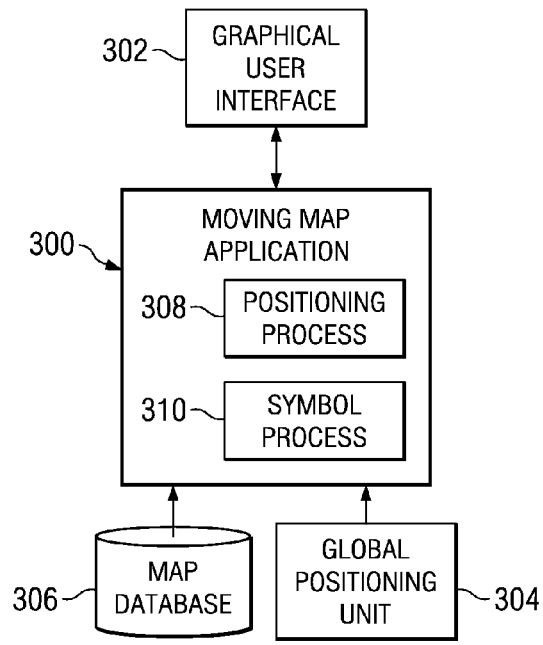
FIG. 3 is a diagram illustrating components used to display a moving map in accordance with an advantageous embodiment of the present invention.

Turning next to FIG. 3, a diagram illustrating components used to display a moving map is depicted in accordance with an advantageous embodiment of the present invention. In this example, moving map application 300 is an example of an application that may execute on a data processing system, such as data processing 200 in FIG. 2. Moving map application 300 may present displays of maps and locations of an aircraft through graphical user interface 302. The location of an aircraft is identified using global positioning unit 304 in these examples. Of course, any other type of positioning or navigation system that provides location information of the aircraft also may be used. For example, in inertial navigation system using a gyroscope may provide the location information.

Based on the location of the aircraft, an appropriate map is located from map database 306 for display on graphical user interface 302. The location of the aircraft and its orientation on the map displayed in graphical user interface 302 is controlled through positioning process 308 in these examples. The location of the aircraft and its orientation is presented using a symbol on the map. A symbol is a graphical indicator that represents an aircraft. Moving map application 300 may be implemented using a number of different products, such as Airport Moving Map, which is available from Jeppesen, Sanderson, Inc. Map database 306 may be located on the aircraft or in a remote location and accessed through a wireless communications link.

The display of the symbol by positioning process 308 is controlled through symbol process 310 in these examples. Symbol process 310 generates the symbol or graphical icon that is displayed to represent an aircraft on a map. The different illustrative embodiments modify symbol process 310 to allow for an anchor point or pivot point for the symbol of the aircraft to change based on the magnification level or zoom level of a map being displayed on graphical user interface 302. Although the depicted examples are directed towards an aircraft, the different advantageous embodiments may be applied to any type of vehicle. For example, the vehicle may be a ship, a truck, or a space craft.

Figure 4:
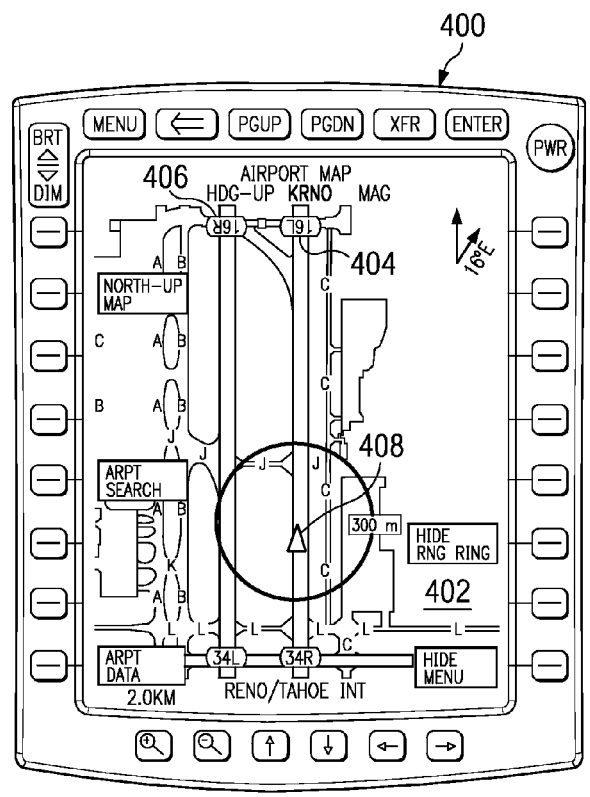
FIG. 4 is a diagram illustrating a moving map in accordance with an advantageous embodiment of the present invention.

Turning now to FIG. 4, a diagram illustrating a moving map is depicted in accordance with an advantageous embodiment of the present invention. Display 400 is an example of a display that may be presented through a graphical user interface, such as graphical user interface 302 in FIG. 3. The display of map 402 in display 400 is generated using an application, such as moving map application 300 in FIG. 3.

Map 402 contains runways 404 and 406. Symbol 408 represents a vehicle, such as an aircraft on runway 408. In these illustrative examples, symbol 408 indicates the relative position of the vehicle with respect to runway 404. The location of the vehicle identified by symbol 408 is obtained through the use of a navigational aid, such as global positioning unit 304 in FIG. 3.

Figure 5:
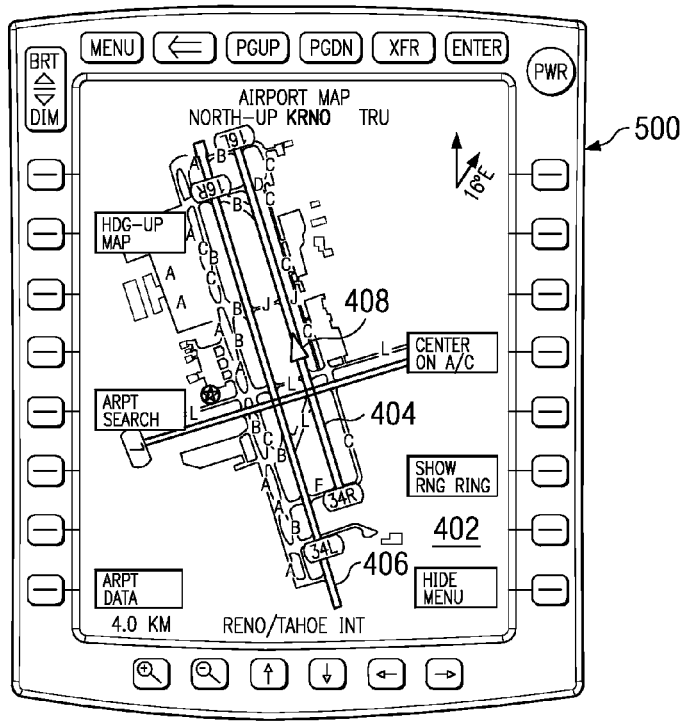
FIG. 5 is a display of a moving map in accordance with an advantageous embodiment of the present invention.

Turning now to FIG. 5, a display of a moving map is depicted in accordance with an advantageous embodiment of the present invention. In this example, display 500 illustrates a different level of detail for map 402.

As can be seen in this example, runway 404 is shown as being smaller in this figure than in FIG. 4 because of the change in the zoom level. Symbol 408, however, remains unchanged in size. Symbol 408, in these advantageous embodiments, is unchanged in size even though the change in the zoom level changes the level of detail for the runways. Symbol 408 remains constant in size to make it easier for a user, such as someone in the flight crew to identify the location of the aircraft with respect to the runways. Making symbol 408 smaller can make it harder to locate the aircraft on map 402.

The different illustrative embodiments provide an improved mechanism in which an identification of the location of an aircraft on a runway can be made when viewing a symbol of the aircraft on a moving map such as map 402 illustrated in FIGS. 4 and 5. These modifications to the current processes are made to increase the ability of the flight crew to accurately identify their location when viewing a moving map. Current moving map applications move symbols representing an aircraft on the map with an anchor point that corresponds to the location of the pilot.

Figure 6:
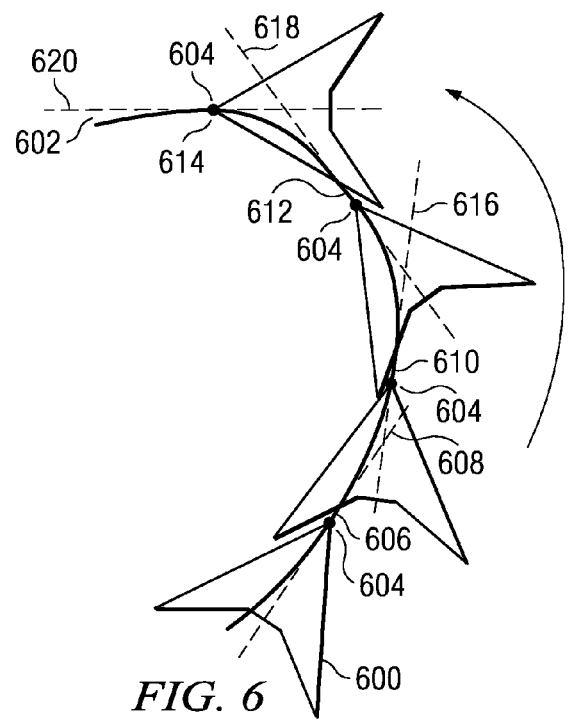
FIG. 6 is a diagram illustrating the movement of a symbol using currently available processes for moving maps in accordance with an advantageous embodiment of the present invention.

Turning now to FIG. 6, a diagram illustrating the movement of a symbol using currently available processes for moving maps is depicted in accordance with an advantageous embodiment of the present invention. In this example, anchor point 604 is located at the front of symbol 600 where the viewpoint is located.

As depicted, symbol 600 moves along path 602 starting at point 606. At point 606, symbol 600 is pointed in the direction along heading axis 608. A heading axis is a line or axis that shows the direction of the aircraft represented by symbol 600 in these examples. The heading axis is not typically displayed, but shown to illustrate the direction of the aircraft represented by symbol 600.

Symbol 600 progresses along path 602 as shown at points 610, 612, and 614. At location 610, symbol 600 is pointed along axis 616. Next, symbol 600 is pointed along heading axis 618 at point 612. Symbol 600 ends up at point 614 and is pointed along heading axis 620.

As can be seen by the progression of symbol 600 along path 602, the change in the heading of symbol 600 has a "fishtail" effect as to how symbol 600 rotates around anchor point 604. This type of movement of symbol 600 along path 602 is not as accurate as desired with respect to the actual movement of the aircraft.

The different illustrative embodiments of the present invention recognize that although the location and heading of symbol 600 along a heading axis is correct, this type of movement of a symbol along a moving map does not match the actual movement of the aircraft with respect to an object on the map because of the location of the anchor point for the symbol.

Figure 7:
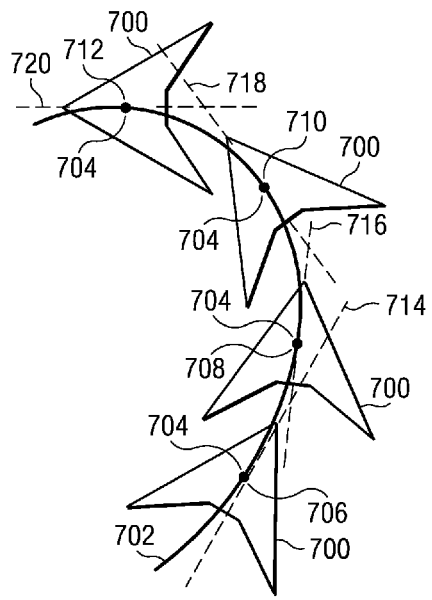
FIG. 7 is a diagram illustrating the movement of a symbol along a path in a moving map in accordance with an advantageous embodiment of the present invention.

Turning now to FIG. 7, a diagram illustrating the movement of a symbol along a path in a moving map is depicted in accordance with an advantageous embodiment of the present invention. In this example, symbol 700 moves along path 702. Path 702 is identical to path 602 in FIG. 6. In this illustrative example, symbol 700 has anchor point 704 in symbol 700 that is selected to reflect a feature in the aircraft that more accurately reflects how the aircraft turns. The location of the anchor point in symbol 700 is selected to provide more realistic movement of the symbol as the symbol moves to indicate the location of the aircraft, while at the same time providing a more accurate position of the viewpoint.

The location of the anchor point at anchor point 704 may be identified in a number of different ways depending on the particular implementation. For example, the anchor point may be based on the center of gravity of the aircraft. Alternatively, the anchor point may be selected to be the point at which the landing gear is located.

In this example, symbol 700 is shown moving through points 706, 708, 710, and 712 as symbol 700 moves along path 702. At point 706, symbol 700 is pointed along heading axis 714. At point 708, symbol 700 is pointed along heading axis 716. Next, at point 710, symbol 700 is pointed along heading axis 718. At point 712, symbol 700 is pointed along the direction of heading axis 720. As can be seen with this movement of symbol 700, symbol 700 turns in a manner that more closely represents the turning of an aircraft along path 702 with this selection of anchor point 704 for rotating symbol 700.

Figure 8:
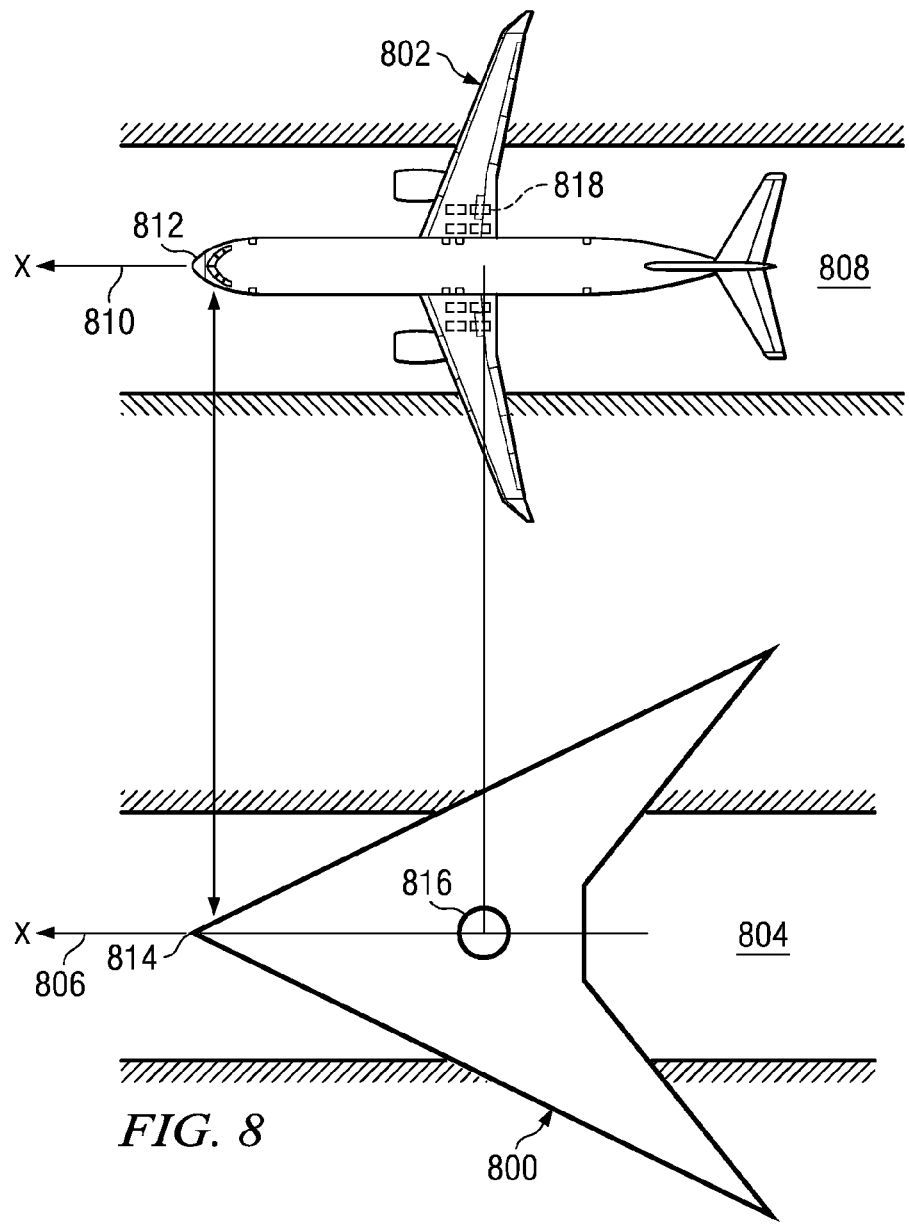
FIG. 8 is a diagram illustrating a correspondence of an anchor point on a symbol to a feature in an aircraft in accordance with an advantageous embodiment of the present invention.

Turning now to FIG. 8, a diagram illustrating a correspondence of an anchor point on a symbol to a feature in an aircraft is depicted in accordance with an advantageous embodiment of the present invention. In this example, symbol 800 is a representation of aircraft 802.

As can be seen in this example, symbol 800 is on runway 804 pointed along the direction of line 806. Line 806 corresponds to a heading axis for aircraft 802. In a similar fashion, aircraft 802 is located on runway 808 and pointed along the direction of line 810.

In these examples, aircraft 802 is displayed to scale with respect to features displayed on a map. In other words, in this example, aircraft 802 is displayed at a size that represents how the aircraft actually sits or travels along runway 808. The scale of a map is used to measure a distance on the map and determine the actual distance on the ground. For example, if the map has a scale of 1:10,000, the measurement on the map in millimeters is multiplied by 10,000 to the distance on the map. Aircraft 802 is displayed with the correct scale with respect to the actual dimensions of aircraft 802. In other words, the measurements for the length and width, as well as the measurements for other features, such as the landing gear and engines, are proportioned to be the same as an actual aircraft with respect to objects such as a runway or a building.

The representation of the position of the pilot in aircraft 802 is in cockpit 812. In a similar fashion, the representation of the location of the pilot is a view point for symbol 800 and is at point 814. In these illustrative examples, the representation of the position of the pilot remains fixed regardless of runway 804's zoom level or level of detail. In other words, although the size of runway 804 may change and the size of symbol 800 does not change, the location of the pilot remains the same.

The different illustrative embodiments provide for a variable location for anchor point 816 in symbol 800. The variable position of anchor point 816 may move along line 806. Line 806 represents the longitudinal axis for symbol 800. The location of anchor point 816 varies depending on the zoom level in these illustrative embodiments.

The actual location of anchor point 816 varies in these examples to maintain an accurate distance between the location of the pilot and landing gear 818. In other illustrative embodiments, the change in the location of anchor point 816 may be relative to the change in location of another feature in aircraft 802, such as the center of gravity. In other words, if the distance between the view point or location of the pilot and the feature changes in the display of aircraft 802, this change in distance is reflected in the location of anchor point 816 even though symbol 800 does not change in size to match the change in scale that occurs when a different level of detail is displayed in response to a change in a zoom level. In these examples, as the level of detail increases, the size of objects displayed on the map increase. Thus, the distance between the viewpoint and the feature remains at a correct scale even though symbol 800 does not have the correct scale.

By changing the location of anchor point 816, as the level of detail in the moving map changes, the movement of symbol 800 on a moving map more closely represents the movement of the aircraft for a particular level of detail. This type of variable anchor point presents a more accurate view position to the user regardless of selected zoom level or level of detail, while at the same time depicting the aircraft symbol movement in a manner that better represents the aircraft movement with respect to features on the map. As a result, this type of feature increases the amount of safety in maneuvering an aircraft along taxiways and runways.

Turning now to FIGS. 9-12, diagrams illustrating changes in an anchor point for a symbol for different levels of map detail is depicted in accordance with an advantageous embodiment of the present invention. These figures are examples presented to illustrate changes in map detail that result in a change in the location of an anchor point for a symbol to maintain an accurate scale for presenting movement of the symbol in the moving map.

Figure 9:
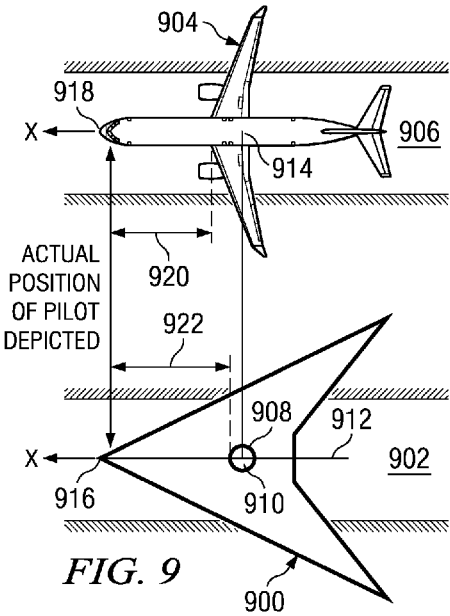
FIG. 9 is a diagram illustrating a symbol displayed on a map with one level of detail in accordance with an advantageous embodiment of the present invention.

With reference first to FIG. 9, a diagram illustrating a symbol displayed on a map with one level of detail is depicted in accordance with an advantageous embodiment of the present invention. In this example, symbol 900 is positioned on runway 902. Symbol 900 represents image 904 on runway 906 in this example. Image 904 is an image of an actual aircraft with dimensions that are correct for the scale or level of detail that is being displayed on a map.

Symbol 900 has anchor point 908, which is located at point 910 on line 912. Anchor point 908 corresponds to a feature in image 904. In this example, the feature is landing gear 914. Point 916 is located on line 912 at the tip of symbol 900 and represents a viewpoint. Point 916 corresponds to the position of the pilot in cockpit 918.

In this example, distance 920 is the distance between cockpit 918 and landing gear 914. Distance 922 in symbol 900 is the distance between point 916 and anchor point 908. In these examples, distance 920 and distance 922 are selected to be equal or proportional such that the movement of symbol 900 on runway 902 moves in a fashion that is similar to the way that image 904 for an aircraft moves on runway 906.

Figure 10:
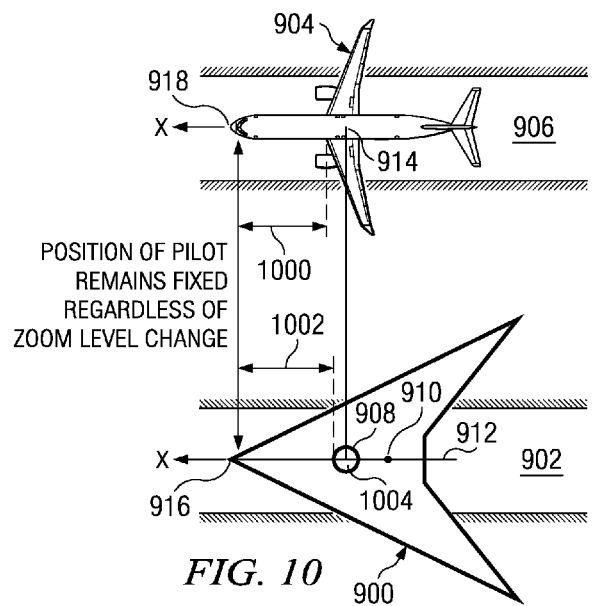
FIG. 10 is a diagram of a symbol on a moving map having another level of map detail in accordance with an advantageous embodiment of the present invention.

Turning now to FIG. 10, a diagram of a symbol on a moving map having another level of map detail is depicted in accordance with an advantageous embodiment of the present invention. In this example, the level of detail in FIG. 10 is at a lower level than that in FIG. 9. This lower level of detail represents a "zoom-out" function that allows a pilot to see more of the map.

With this lower level of detail, the actual size of image 904 is smaller to maintain the scale of image 904 with respect to runway 906. In current moving map applications, symbol 900 remains unchanged in size to increase a user's ability find symbol 900.

With a decrease in level of detail, a new smaller distance is present between cockpit 918 and landing gear 914. This distance is distance 1000, which is smaller in value than distance 920 in FIG. 9. In response to this change in distance between distance 1000 and distance 920 in FIG. 9, anchor point 908 is moved to a new point, point 1002 along point 916.

Thus, distance 1002 is now present between point 916 and point 1004, which is the new location of anchor point 908. As can be seen, anchor point 908 has moved from point 908 to point 1004. The value for distance 1000 and distance 1002 are selected to be the same or around the same value in these examples. The change of the position of anchor point 908 to point 1004 is used to provide a more realistic movement of symbol 900 even though symbol 900 has not changed in size as compared to image 904. The scale of the distance between point 916 and anchor point 908 is set to maintain the scale of the distance between the view point, cockpit 918 and the selected feature, landing gear 914.

Figure 11:
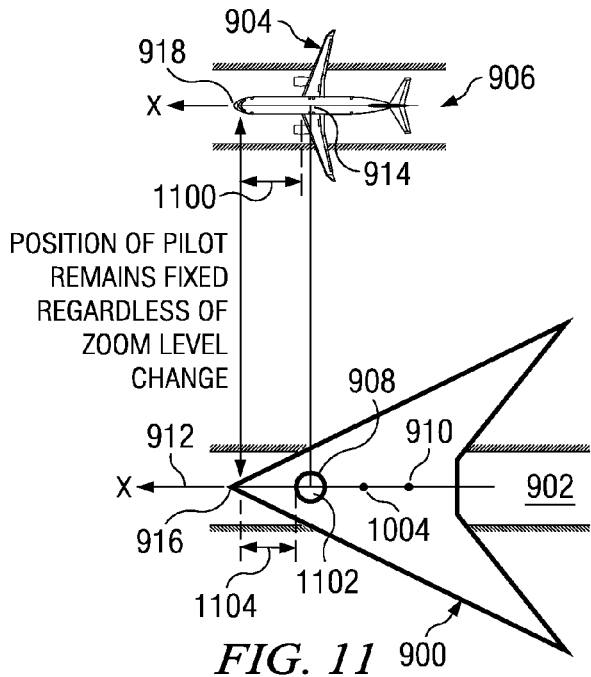
FIG. 11 is a diagram of a symbol at yet another level of map detail in accordance with an advantageous embodiment of the present invention.

Turning now to FIG. 11, a diagram of a symbol at yet another level of map detail is depicted in accordance with an advantageous embodiment of the present invention. In this particular example, the amount of detail is again reduced. As can be seen, distance 1100 is less than distance 1000 in FIG. 10 for image 904 to maintain the correct scale of image 904 with respect to runway 906.

As a result, anchor point 908 is moved along line 912 to point 1102, which is closer to point 916. This change in the position of anchor point 908 is used to set distance 1104 to a value that is the same or around the same as distance 1100. This change maintains the correct scale for the distance between landing gear 914 and cockpit 918. This change allows for symbol 900 to move in a fashion that is accurate for image 904 even though symbol 900 has not changed in size.

Figure 12:
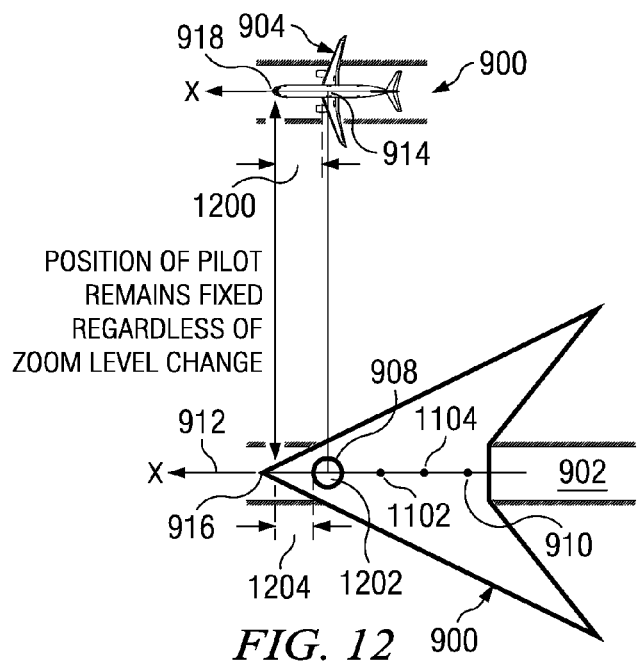
FIG. 12 is a diagram of a symbol displayed on the moving map with another level of detail in accordance with an advantageous embodiment of the present invention.

With reference now to FIG. 12, a diagram of a symbol displayed on the moving map with another level of detail is depicted in accordance with an advantageous embodiment of the present invention. In this particular example, image 904 is now shown with even less detail resulting from zooming out from the map.

As can be seen, distance 1200 is now less than the distance shown in previous examples. As a result, anchor point 908 is moved closer to point 916 along line 912 to point 1202 such that distance 1204 is around the same as distance 1200. By changing anchor point 908 to point 1002, movement of symbol 900 resembles the movement that would occur if symbol 900 was resized to meet the dimensions of image 904. If the level of detail is increased, anchor point 908 will move farther away from point 916 to maintain a distance that is equal to cockpit 918 and landing gear 914.

Figure 13:
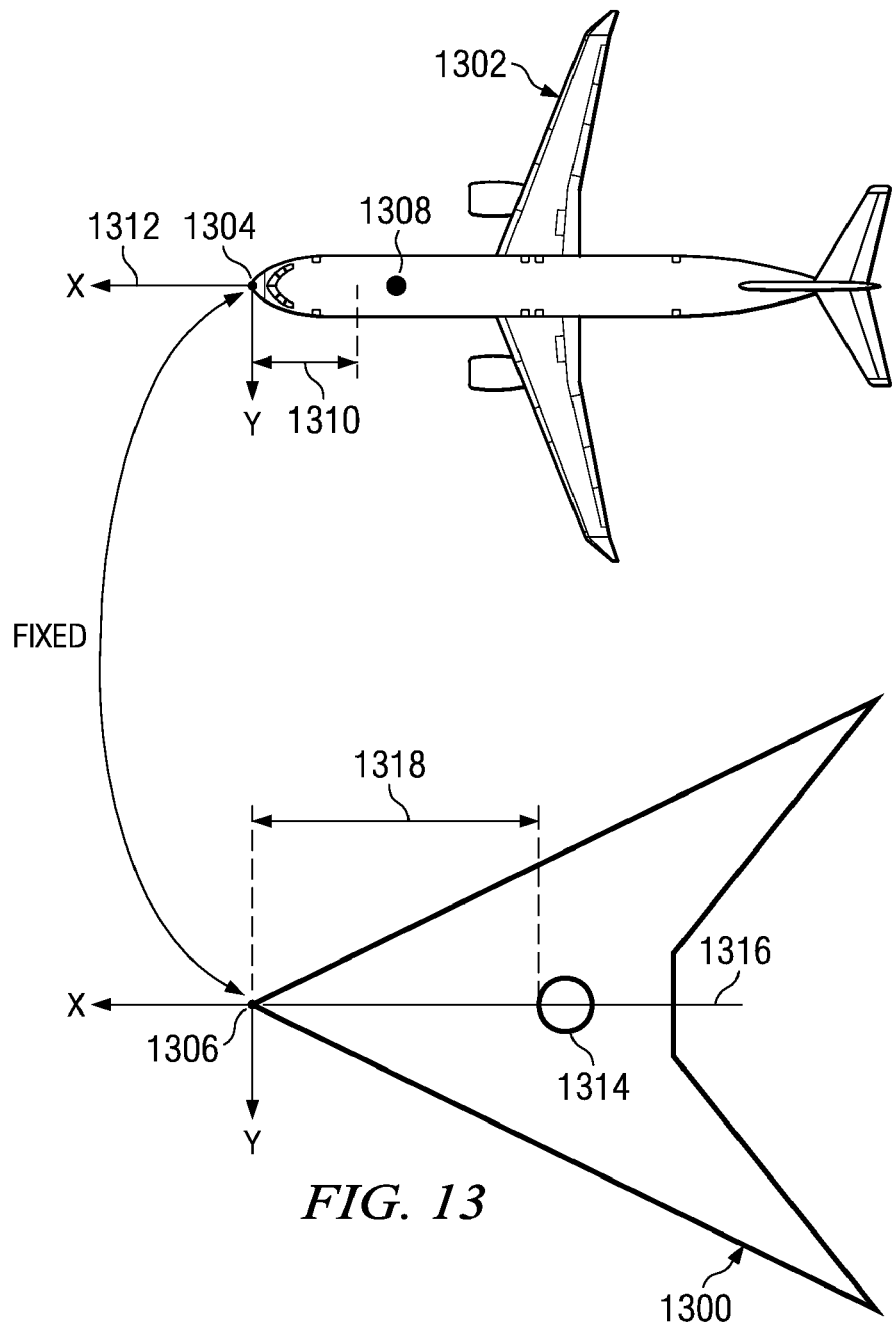
FIG. 13 is a diagram illustrating the process used to set an anchor point for a symbol in accordance with an advantageous embodiment of the present invention.

With reference now to FIG. 13, a diagram illustrating the process used to set an anchor point for a symbol is depicted in accordance with an advantageous embodiment of the present invention. In this example, symbol 1300 represents aircraft 1302.

As depicted, point 1304 represents the location of the pilot on a map with respect to aircraft 1302. Point 1306 represents the pilot position on the map with respect to symbol 1300. In these examples, both point 1304 and point 1306 are fixed. Point 1308 represents the location of a navigational sensor on aircraft 1302. This sensor may be, for example, a global positioning system antenna.

As shown, aircraft 1302 is an image that is scaled to represent the actual size of the aircraft on the runway with respect to the map. In other words, aircraft 1302 is set with the size that would be to scale with respect to the level of detail for the map of the runway.

In these examples, the actual position of the pilot on the map is determined using the location of the navigation sensor at point 1308. Distance 1310 is present between point 1304 and point 1308. The position of the navigational sensor at point 1308 may be identified through data received by the aircraft. Points 1304 and 1308 are along the line 1312, which represents a heading axis for aircraft 1302. The position of anchor point 1314 in symbol 1300 may be identified from this information. The position of the pilot at point 1304 is set equal to point 1306 in these examples.

Thereafter, the location of anchor point 1314 is placed along line 1316 by subtracting the distance between the pilot position at point 1304 and the aircraft feature on the map. In these examples, the aircraft feature or component is the landing gear. In this example, the distance is distance 1318.

Figure 14:
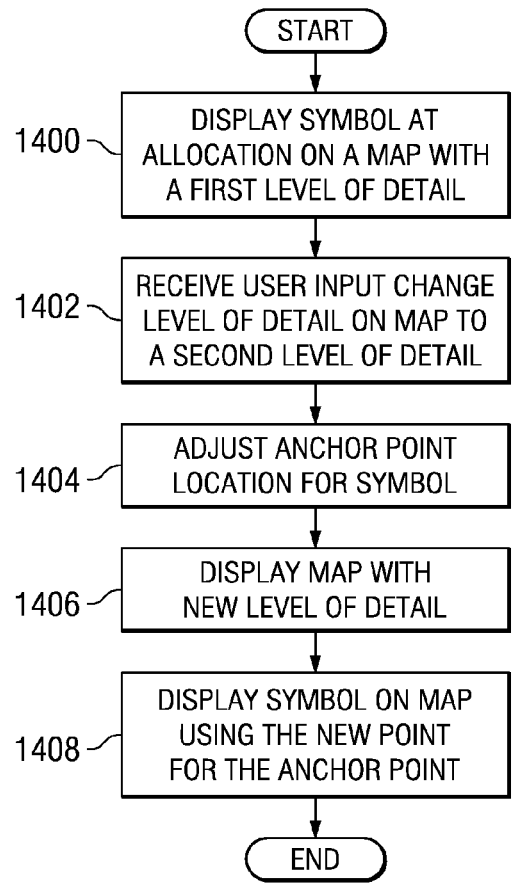
FIG. 14 is a flowchart of a process for displaying a symbol on a moving map in accordance with an advantageous embodiment of the present invention.

Turning now to FIG. 14, a flowchart of a process for displaying a symbol on a moving map is depicted in accordance with an advantageous embodiment of the present invention. The process illustrated in FIG. 14 may be implemented in a software component, such as moving map application 300 in FIG. 3. In particular, this process may be symbol process 310 in FIG. 3.

The process begins by displaying a symbol on a location in a map with a first level of detail (operation 1400). The symbol represents a position of the aircraft on the map, moves on the map in a manner that represents movement of the aircraft with respect to features on the map, has a fixed level of detail that does not change as levels of detail change for the map, and has an anchor point at a first point on the symbol in which the anchor point is used as a point of rotation for the symbol.

The process receives user input changing a level of detail on the map to a second level of detail (operation 1402). Depending on the user input, the second level of detail may be more detail or less detail than the first level of detail.

The anchor point location for the symbol is adjusted based on the change in the dimensions for the aircraft on the map (operation 1404). The new point for the anchor point on the symbol is identified in operation 1404 such that the view point of the symbol at the second level of detail remains fixed relative to the display of the symbol at the first level of detail.

The process then displays the map with the new level of detail (operation 1406) and then displays the symbol on the map using the new point for the anchor point (operation 1408) with the process terminating thereafter.

Figure 15:
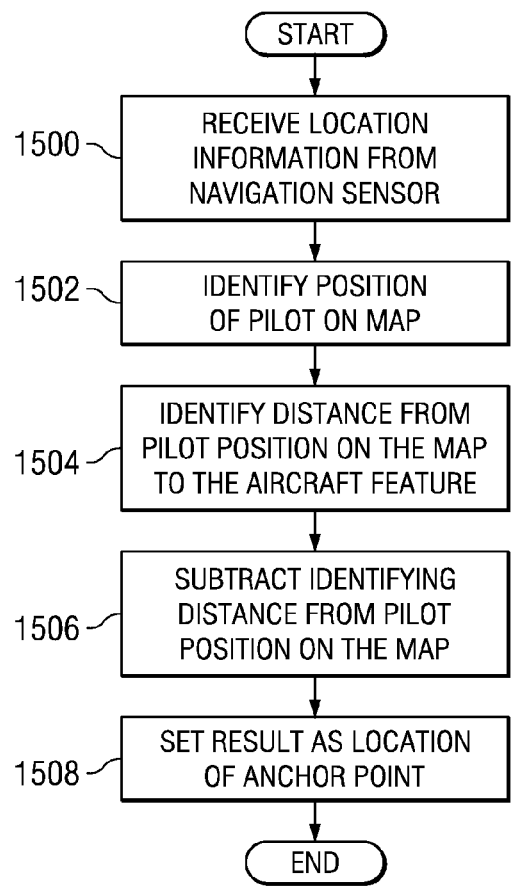
FIG. 15 is a flowchart of the process for identifying an anchor position based on the position of the navigation sensor in accordance with an advantageous embodiment of the present invention.

Turning now to FIG. 15, a flowchart of a process for identifying an anchor position based on the position of the navigation sensor is depicted in accordance with an advantageous embodiment of the present invention. The process illustrated in FIG. 15 is a more detailed description of operation 1404 in FIG. 14.

The process begins by receiving location information from a navigational sensor (operation 1500). Thereafter, the position of the pilot on the map is identified (operation 1502). The location of the navigation sensor is used to identify the location of the pilot on the map. The distance of the pilot from the navigation sensor is added to the position of the navigation sensor with respect to the heading access to identify the position of the pilot.

Next, the distance from the pilot position on the map to the aircraft feature is identified (operation 1504). In these examples, the aircraft feature is the feature for which the anchor point is to correspond. In these particular examples, the feature is the landing gear. Other features, such as a center of gravity also may be used.

Then, the distance from the pilot position to the aircraft feature is subtracted from the pilot position on the map (operation 1506). This location provides the location of the anchor point. The result is set as the location of the anchor point (operation 1508) with the process terminating thereafter.

The process illustrated in FIG. 15 may be performed each time a movement of the aircraft results in a movement of symbol 1300 in FIG. 13. For example, the movement may be along the directional axis or a rotation of the aircraft that changes the direction of the heading access. The process illustrated in FIG. 15 is one example of how the identification of an anchor point may be made. Other types of processes may be used depending on the particular implementation. The feature of changing the anchor point based on the change in dimensions of an aircraft with respect to its actual size on a map may be made a number of different ways.

Thus, the different advantageous embodiments of the present invention provide a computer implemented method, apparatus, and computer usable program code for displaying a symbol representing a vehicle. The symbol representing the vehicle is displayed at a first level of detail, wherein the symbol has an anchor point at a first location on the symbol, wherein the anchor point is a point at which the symbol rotates. Responsive to receiving a request of a second level of detail, a second location for the anchor point on the symbol is identified such that view point of the symbol at the second level of detail remains fixed relative to the display of the symbol at the first level of detail. The symbol is displayed using the second location for the anchor point.

In this manner the different embodiments of the present invention provide a symbol that is easy to find at different levels of detail for a moving map. Additionally, the adjustment of the anchor point provides a movement of the symbol that more accurately represents movement of the vehicle even though the size of the symbol does not change.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for displaying a symbol representing an aircraft, the method comprising:

displaying the symbol representing the aircraft at a location on a map, the symbol having a first level of detail that does not change, wherein the symbol represents a position of the aircraft on the map, moves on the map in a manner that represents movement of the aircraft with respect to features on the map, and has an anchor point at a first point on the symbol in which the anchor point is used as a point of rotation for the symbol, the first point having a location on the symbol relative to a feature of the aircraft;

displaying the map at a second level of detail that changes with respect to a change in scale of the map while the first level of detail for the symbol remains fixed;

responsive to receiving a request to change the second level of detail, identifying, by a processor, a second point for the anchor point on the symbol such that a view point of the symbol on the map at the first level of detail remains fixed relative to the change in display of the map at the second level of detail, wherein the first point and the second point are different points; and displaying the symbol on the map using the second point for the anchor point.

2. The method of claim 1, wherein the identifying step comprises:

identifying the second point as being a position of the pilot for the aircraft on the map minus a distance of the position of the pilot for the aircraft to a feature of the aircraft.

3. The method of claim 2, wherein the position of the pilot for the aircraft on the map is a position of a navigational sensor on the map plus a distance of the navigational sensor on the map to the pilot.

4. The method of claim 2, wherein the feature of the aircraft is a landing gear for the aircraft.

5. The method of claim 1, wherein the identifying step comprises:

selecting the second point on the symbol such that a distance between a view point in the aircraft and a feature of the aircraft correspond to second level of detail.

6. The method of claim 1, wherein the map is selected between a map of an airport having runways and taxiways and a map of a geographic area over which the aircraft is flying.

7. A method for displaying a symbol representing a vehicle, the computer implemented method comprising:

displaying the symbol representing the vehicle at a first level of detail, wherein the symbol has an anchor point at a first location on the symbol, wherein the anchor point is a point at which the symbol rotates, and the first location on the symbol corresponds to a feature of the vehicle;

responsive to receiving a request of a second level of detail, identifying a second location for the anchor point on the symbol such that a view point of the symbol at the second level of detail remains fixed relative to the display of the symbol at the first level of detail, the second location for the anchor point is identified by calculating a proportional distance relative to a distance between a pilot position and the feature of the vehicle, wherein the first point and the second point are different points; and displaying the symbol using the second location for the anchor point.

8. The method of claim 7, wherein the view point is a location of a pilot of the vehicle.

9. The method of claim 8, wherein the identifying step comprises:

setting the second location of the anchor equal to a position of a pilot minus a distance of the position of the pilot to the feature of the vehicle.

10. The method of claim 8, wherein the anchor point represents a feature in the vehicle.

11. The method of claim 10, wherein the feature is a landing gear.

12. The method of claim 11, wherein the position of the pilot is equal to a position of a navigation sensor plus a distance of the navigation sensor to the pilot.

13. The method of claim 7, wherein the vehicle is selected from one of an aircraft, ship, submarine, or truck.

14. A computer program product comprising:

a computer readable storage medium having computer usable program code for displaying a symbol representing an aircraft, the computer program product comprising:

computer usable program code for displaying the symbol representing the aircraft at a location on a map, the symbol having a first level of detail that does not change, wherein the symbol represents a position of the aircraft on the map, moves on the map in a manner that represents movement of the aircraft with respect to features on the map, and has an anchor point at a first point on the symbol in which the anchor point is used as a point of rotation for the symbol, the first point having a location on the symbol relative to a feature of the aircraft;

computer usable program code for displaying the map on a graphical user interface at a second level of detail that changes with respect to a change in scale of the map while the first level of detail for the symbol remains fixed, the map located from a map database based on an aircraft location;

computer usable program code responsive to receiving a request to change the second level of detail, for identifying a second point for the anchor point on the symbol such that a view point of the symbol on the map at the first level of detail remains fixed relative to the change in display of the map at the second level of detail, wherein the first point and the second point are different points; and computer usable program code for displaying the symbol on the map using the second point for the anchor point.

15. The computer program product of claim 14, wherein the computer usable program code responsive to receiving a request of a second level of detail, for identifying a second point for the anchor point on the symbol such that view point of the symbol at the second level of detail remains fixed relative to the display of the symbol at the first level of detail comprises:

computer usable program code for selecting the second point on the symbol such that a distance between a view point in the aircraft and a feature of the aircraft correspond to second level of detail.

16. The computer program product of claim 14, wherein the computer usable program code responsive to receiving a request of a second level of detail, for identifying a second point for the anchor point on the symbol such that view point of the symbol at the second level of detail remains fixed relative to the display of the symbol at the first level of detail comprises:

computer usable program code for identifying the second point as being a position of the pilot for the aircraft on the map minus a distance of the position of the pilot for the aircraft to a feature of the aircraft.

17. The computer program product of claim 16, wherein the position of the pilot for the aircraft on the map is a position of a navigational sensor on the map plus a distance of the navigational sensor on the map to the pilot.

* * * * *